(12) United States Patent
Jones et al.

(10) Patent No.: US 6,211,102 B1
(45) Date of Patent: Apr. 3, 2001

(54) VACUUM FORMED COATED FIBROUS MAT

(75) Inventors: Damon L. Jones; Carl Douglas Ray, both of Terre Haute, IN (US); Keith Brechtelsbauer, Richmond, VA (US)

(73) Assignee: Tredegar Film Products Corporation, Richmond, VA (US)

( * ) Notice: Subject to any disclaimer, the term of this patent is extended or adjusted under 35 U.S.C. 154(b) by 0 days.

(21) Appl. No.: 09/274,069

(22) Filed: Mar. 22, 1999

(51) Int. Cl.[7] .............................. B32B 27/04; B32B 27/12
(52) U.S. Cl. .......................... 442/149; 428/137; 428/138; 156/272.6
(58) Field of Search .................. 442/149; 428/137, 428/138; 156/272.6

(56) References Cited

U.S. PATENT DOCUMENTS

| | | | |
|---|---|---|---|
| H1670 | * 7/1997 | Ahr et al. | 128/287 |
| 3,955,019 | 5/1976 | Keith | 428/35 |
| 4,323,069 | * 4/1982 | Ahr et al. | 128/287 |
| 4,828,910 | 5/1989 | Haussling | 428/284 |
| 4,995,930 | * 2/1991 | Merz et al. | 156/209 |
| 5,068,001 | 11/1991 | Haussling | 156/222 |
| 5,175,042 | 12/1992 | Chomarat | 428/139 |

FOREIGN PATENT DOCUMENTS

| | | | |
|---|---|---|---|
| 4016348 | 11/1991 | (DE) | |
| 19634196 | 2/1998 | (DE) | |
| 0447090 | 9/1991 | (EP) | |
| 0825018 | 2/1998 | (EP) | |
| 403 187 B1 | * 8/1999 | (EP) | B32B/5/18 |
| 0949066 | 10/1999 | (EP) | |
| WO9613979 | 5/1996 | (WO) | |
| WO9810921 | 3/1998 | (WO) | |
| WO9815399 | 4/1998 | (WO) | |

OTHER PUBLICATIONS

Copy of PCT/ISA/220/210 for PCT/US00/06050 dated Jul. 14,2000.

* cited by examiner

Primary Examiner—Terrel Morris
Assistant Examiner—Arti Singh
(74) Attorney, Agent, or Firm—Jenkens & Gilchrist a Professional Corporation

(57) ABSTRACT

A composite structure having a fibrous mat with perforated film coverings vacuumed formed on both sides of the fibrous mat. The composite structure is affixed between a structural foam and a soft foam to create a component part for use in applications such as automotive trim parts.

28 Claims, 5 Drawing Sheets

VACUUM FORMED COATED FIBROUS MAT

BACKGROUND

The present invention generally relates to mats of fibrous materials, and in particular to laminates of fibrous mats with perforated film coverings.

Fibrous mats are used in various applications such as in the construction of automotive trim parts. Prior technology formed the fibrous mats for automotive trim by spraying adhesives onto chopped fiberglass roving. The adhesive bonds the fiberglass together and to substrates. Different layers of fiberglass, foams, adhesives, and other materials were stacked together by hand to construct a sandwich, which is then formed into a biscuit and used for the production of the finished trim part.

However, the use of the prior art fibrous mats required many steps and excessive labor to produce the biscuit for use in the automotive trim parts. Therefore, there is a need for fibrous mats that can be used for the formation of multiple layer structure with fewer steps and less labor. Additionally, there is need for a fibrous mat for use in forming a multiple layer structure that has a lower weight, good thermoformability, good acoustical properties, and improved stiffness.

SUMMARY

In one embodiment, the present invention is a composite structure generally including a fibrous mat, a first film covering, and a second film covering. The fibrous mat has a mat first side and a mat second side, and formed from a plurality of fibers such that a plurality of passages are formed therein. The first film covering is disposed on the mat first side of the fibrous mat, and has a plurality of first film protrusions with first film apertures that extend into the plurality of passages in said fibrous mat. The second film covering is disposed on the mat second side of said fibrous mat and has a plurality of second film protrusions with second film apertures that extend into the plurality of passages in said fibrous mat.

In another embodiment, the present invention is a composite structure including a fibrous mat having a mat first side and a mat second side, and an adhesive film covering disposed on the mat first side of said fibrous mat. The fibrous mat is formed from a plurality of fibers such that a plurality of passages are formed therein. The adhesive film covering has a plurality of adhesive film protrusions with adhesive film apertures that extend into the plurality of passages in the fibrous mat.

In yet another embodiment, the present invention is a composite structure including a fibrous mat having a mat first side and a mat second side, and a multi layer film covering disposed on the mat first side of said fibrous mat. The fibrous mat is formed from a plurality of fibers such that a plurality of passages are formed therein. The multi layer film covering includes a plurality of multi layer film protrusions with multi layer film apertures, the plurality of multi layer film protrusions extending into the plurality of passages in said fibrous mat.

In yet another embodiment, the present invention is a process for forming a composite structure including the steps of providing a fibrous mat having a mat first side and a mat second side; placing the mat second side of the fibrous mat on a first perforated screen; disposing a first film covering material on the first side of the fibrous mat disposed on the first perforated screen; applying a vacuum to the back side of the first perforated screen with the fibrous mat and first film covering material disposed thereon to form a first film covering on the first side of the fibrous mat; placing the fibrous mat onto a second perforated screen with the first film covering adjacent to the second perforated screen; and, disposing a second film covering material onto the second side of the fibrous mat disposed on the second perforated screen; applying a vacuum to the back side of the second perforated screen with the first film covering, the fibrous mat, and the second film covering material disposed thereon to form a second film covering on the second side of the fibrous mat.

In yet another embodiment, the present invention is a process for forming a composite structure including the steps of providing a fibrous mat having a mat first side and a mat second side; placing the mat second side of the fibrous mat on a first perforated screen; coextruding a multiple layer first film covering material on the first side of the fibrous mat disposed on the first perforated screen; and, applying a vacuum to the back side of the first perforated screen with the fibrous mat and first film covering material disposed thereon to form a first film multiple layer covering on the first side of the fibrous mat.

In yet another embodiment, the present invention is a composite part including a composite mat structure and a foam layer. The composite mat structure includes a fibrous mat having a mat first side and a mat second side, a first film covering disposed on the mat first side of said fibrous mat, a second film covering disposed on the mat second side of said fibrous mat. The fibrous mat of the composite mat structure is formed from a plurality of fibers such that a plurality of passages are formed therein. The first film covering of the composite mat structure has a plurality of first film protrusions with first film apertures, the plurality of first film protrusions extending into the plurality of passages in the fibrous mat. The second film covering of the composite film structure includes a plurality of second film protrusions with second film apertures, the plurality of second film protrusions extending into the plurality of passages in the fibrous mat. The foam layer adheres to the first film covering of said composite mat structure. In a further embodiment, the present invention the first film covering is a multi layer film having a first external adhesive layer adjacent to said first foam layer. In another further embodiment, the present invention includes a second foam layer adhered to the second film covering of the composite mat structure. In yet a further embodiment, the second film covering is a multi layer film having an second external adhesive layer adjacent to the second foam layer.

DETAILED DESCRIPTION

Referring now to the figures, and in particular to FIGS. 1–4, there is disclosed an embodiment of the present invention illustrated as the composite structure 10. The composite structure 10 generally comprises a fibrous mat 100 with a mat first side 110 and a mat second side 120, a first film covering 200 disposed on the mat first side 110, and a second film covering 300 disposed on the mat second side 120. The first film covering 200 includes first film protrusions 210 extending into the fibrous mat 100 and first film perforations 220. The second film covering 300 includes second film protrusions 310 extending into the fibrous mat 100 and second film perforations 320.

The fibrous mat 100 is formed of a plurality of synthetic or natural fibers 130 such as fiberglass, sisal, polymeric fibers, excelsior, combinations thereof, or the like. The fibers 130 in the fibrous mat 100 are arranged such that mat openings/passages 140 are formed in the fibrous mat 100. The mat opening/passages 140 in the fibrous mat 100 provide an open area in the fibrous mat 100 between the mat first side 110 and mat second side 120. In one embodiment, the fibrous mat 100 includes a binder 150 that holds together the fibers 130 in the fibrous mat 100.

The characteristics of the fibrous mat 100, such as stiffness, thickness, and/or open area, are selected based upon the contribution of the fibrous mat 100 to the criteria of the composite structure 10, such as stiffness and sound deadening. In one preferred embodiment, the fibrous mat 100 has a thickness of from about 10 mils to about 25 mils and an open area of from about 10% to about 50% open area.

The parameters of the components of the fibrous mat 100, such as the fibers 130 and the binder 150, determine the characteristics of the fibrous mat 100. For example, the density, diameter, size, and modulus of elasticity of the fibers 130 will contribute to the stiffness and open area properties of the fibrous mat 100. The binder 150 will also contribute to the stiffness and open area of the fibrous mat 100.

The first film covering 200 adheres to the fibers 130 exposed on the mat first side 110 of the fibrous mat 100. In a preferred embodiment, the first film covering 200 encapsulates some of the fibers 130 on the mat first side 110. The first film protuberances 210 extend through the mat first side 110 into the mat opening/passages 140 of the fibrous mat 100. The first film perforations 220 are formed at the end of the first film protuberances 210.

Similar to the first film covering 200, the second film covering 300 adheres to the fibers 130 exposed on the mat second side 120 of the fibrous mat 100. In a preferred embodiment, the second film covering 300 encapsulates some of the fibers 130 on the mat second side 120. The second film protuberances 310 extend into the mat openings/passages 140 on the mat second side 120 of the fibrous mat. The second film perforations 320 are formed in the end of the second film protuberances 310 of the second film covering 300.

The extension of the first film protuberances and the second film protuberances 310 into the fibrous mat 100, inhibit the individual fibers 130 from escaping through the first film perforations 220 and the second film perforations 320, should those individual fibers become loose from the fibrous mat 100. Additionally, at various points in the fibrous mat 100, the first film perforations 220 may even join with the second film perforations 320 to form a passageway from the first film covering 200 to the second film covering 300.

The material of the first film covering 200 and the second film covering 300 is selected based upon the desired characteristics that the respective film covering will provide the composite structure 10. In one embodiment, the first film covering 200 and/or the second film covering 300 provides stiffness to the composite structure by using a thermoplastic material. Examples of thermoplastic materials that can be used in the present invention include high density polyethylene (HDPE), nylon, polyester, polypropolyene, polystyrene, polycarbonate, combinations thereof, or the like. Additionally, the material of the first film covering 200 and/or second film covering 300 can be filled to improve stiffness, with materials such as calcium carbonate, talc, clay, or other common filler materials.

In another embodiment, the first film covering 200 and/or the second film covering 300 is formed from an adhesive material to facilitate bonding of the composite structure 10 to other structures. Examples of adhesive materials that can be used in the present invention include copolymers of ionomers, ethylene acrylic acid (EAA), ethylene methyl acrylic acid (EMAA), ethylene vinyl acetate (EVA), ultra low density polyethylene (ULDPE), ethyl methyl acrylate (EMA), combinations thereof, or the like.

Figure 1:
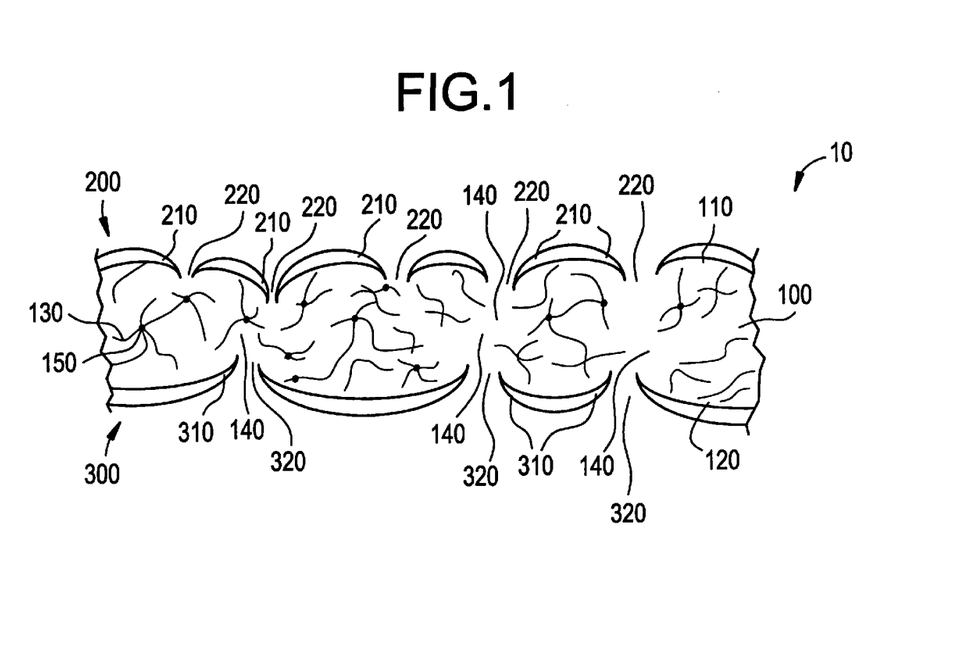
FIG. 1 is an enlarged partial cross section of a laminate illustrating an embodiment of the present invention
Figure 2:
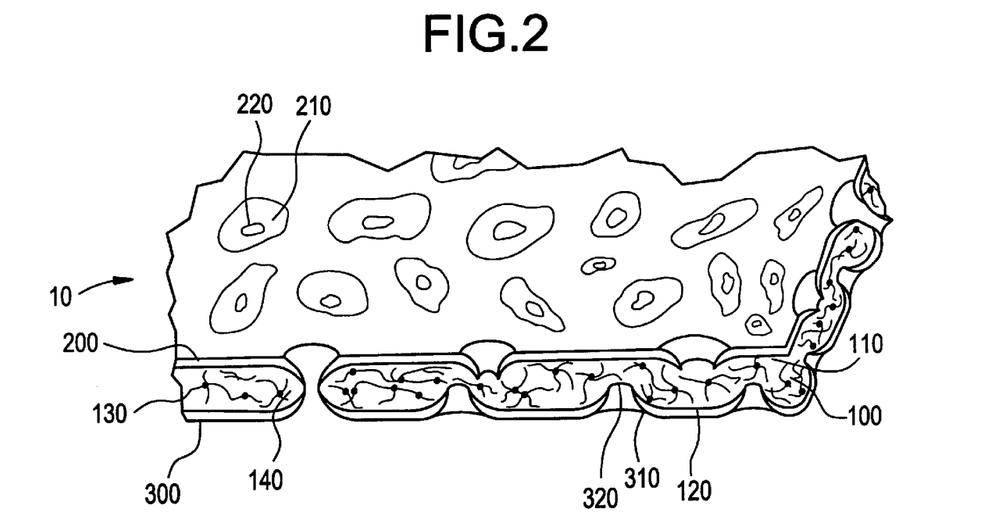
FIG. 2 is an enlarged partial perspective view of the laminate from FIG. 1.
Figure 3:
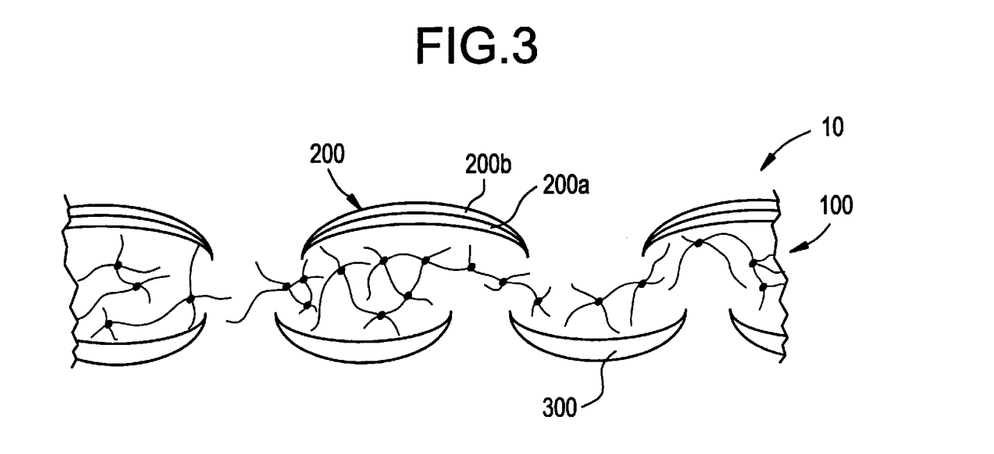
FIG. 3 is an enlarged partial cross section of another embodiment of the laminate from FIG. 1.
Figure 4:
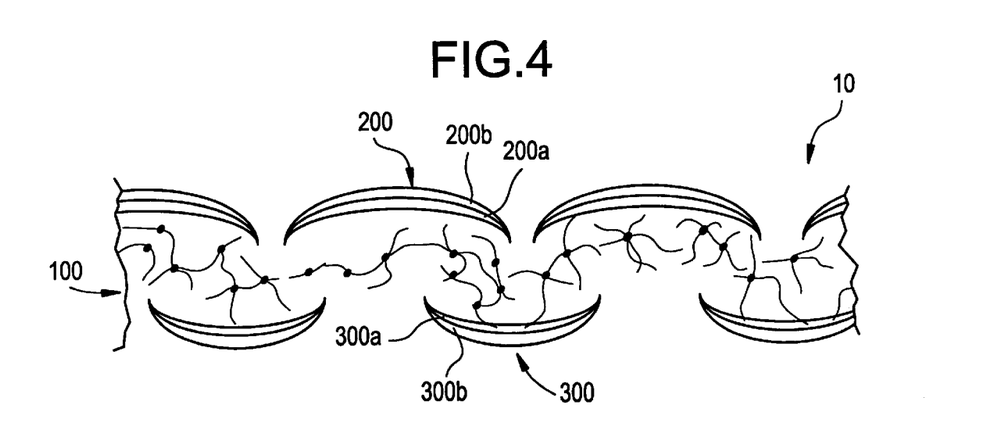
FIG. 4 is an enlarged partial cross section of yet another embodiment of the laminate from FIG. 1.

In yet another embodiment, the first film covering 200 and/or the second film covering 300 is a co-extrusion of two or more layers of various materials, as shown in FIGS. 3 and 4. For example, as shown in FIG. 3, the second film covering 200 can be a co-extrusion having a first film high density polyethylene layer 200a adjacent to the fibrous mat 100 to provide structural rigidity, and a first film adhesive material layer 200b on the opposing side to facilitate bonding of the composite structure 10. The co-extrusion of a material such as high density polyethylene between an adhesive layer and the fibrous mat 100 prevents the migration of the adhesive layer into the fiber material. In another example, as illustrated in FIG. 4, the second film covering 300 is also a co-extrusion having a second film high density polyethylene layer 300a adjacent to the fibrous mat 100 to provide structural rigidity, and a second film adhesive material layer 300b on the opposing side to facilitate bonding of the composite structure 10.

A part of the present invention is the unexpected additional stiffness of the composite structure 10. The completed composite structure has a stiffness greater than the stiffness of the fibrous mat 100, the first and second film coverings 200 and 300, or the expected stiffness of the combination of the fibrous mat 100, the first film 200, and the second film 300.

Figure 5:
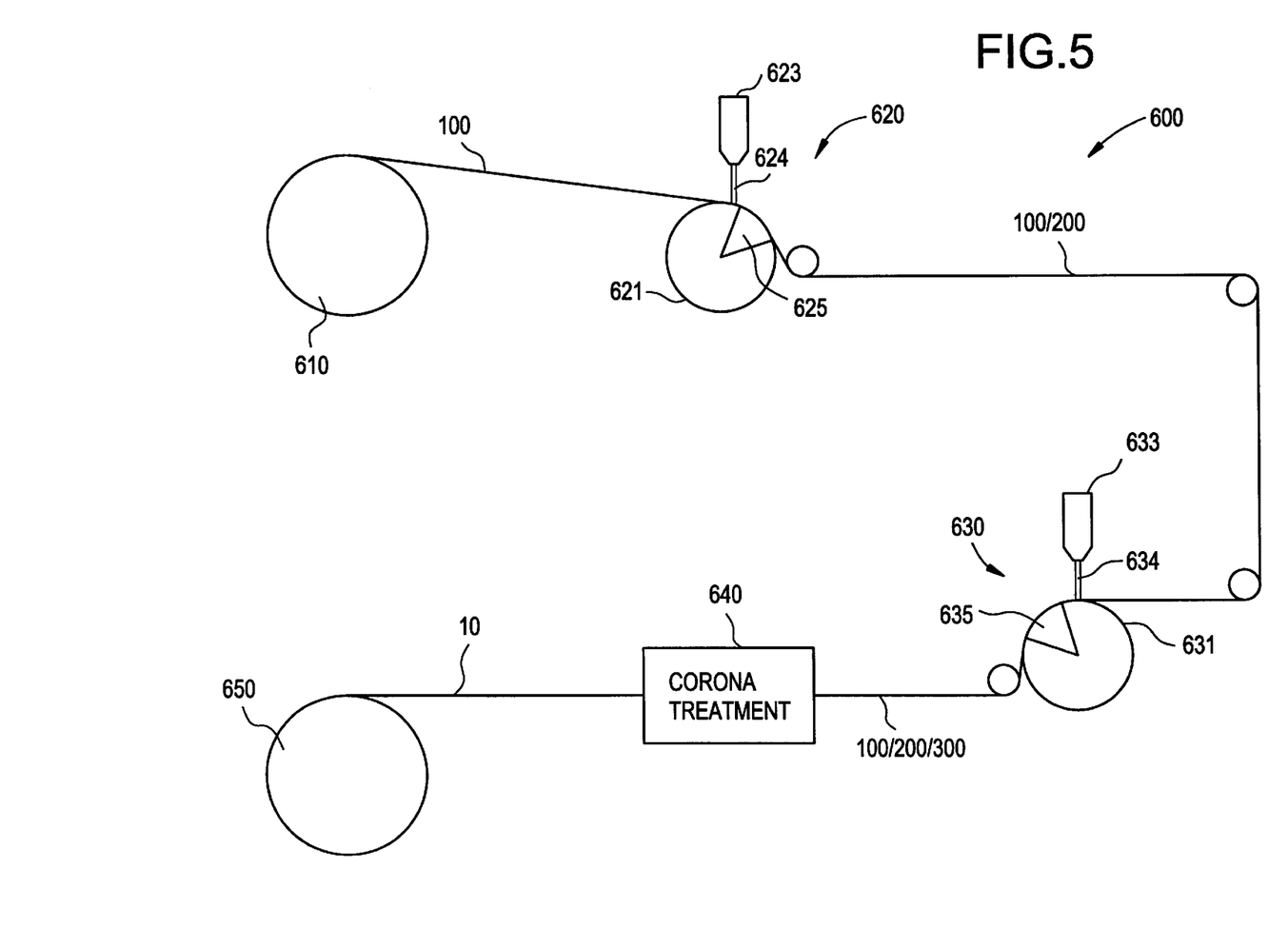
FIG. 5 is schematic view of one embodiment of a process for forming the laminate of the present invention.
Figure 6:
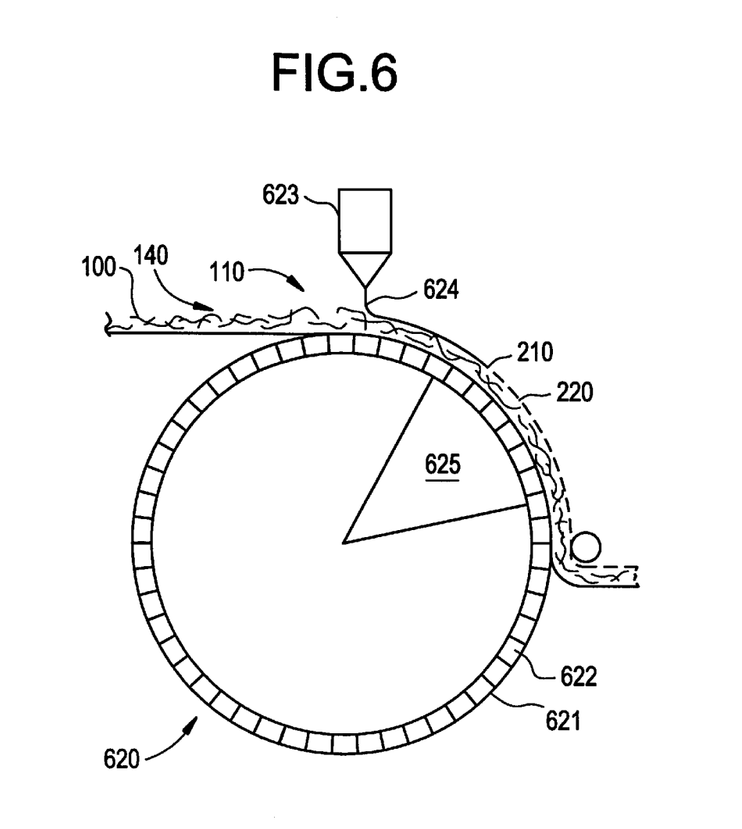
FIG. 6 is a more detailed schematic of the first film covering forming station from the process in FIG. 5.
Figure 7:
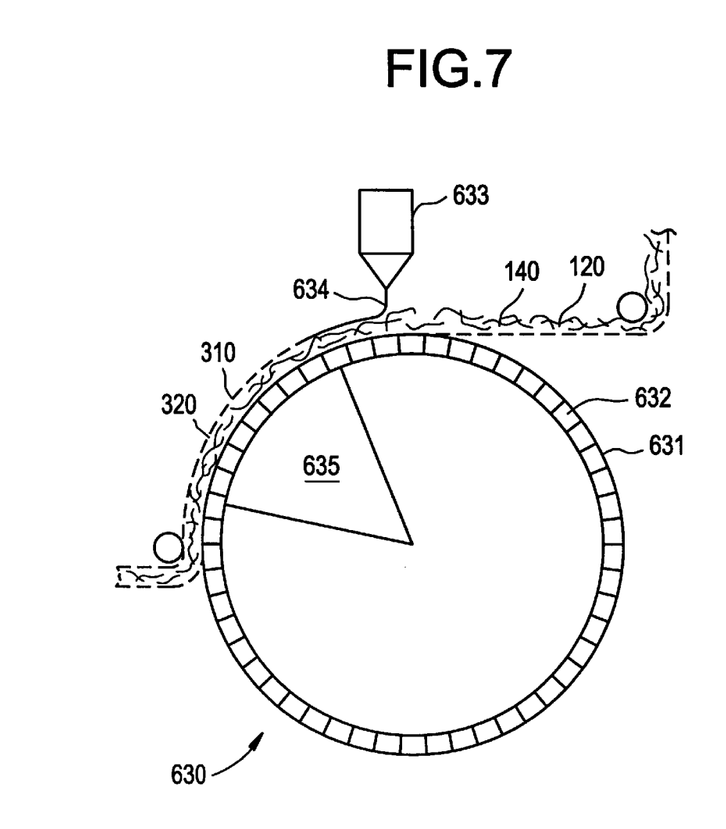
FIG. 7 is a more detailed schematic of the second film covering forming station from the process in FIG. 5; and, FIG. 8 is a partial perspective view of a component part made according to the present invention with the composite structure from FIG. 4.

Referring now to FIGS. 5–7, there shown one embodiment of a process for forming the composite structure 10 from FIGS. 1–4, illustrated as the forming process 600. The forming process 600 generally includes a fibrous mat supply 610, a first film covering forming station 620, a second film covering forming station 630, a corona treating station 640, and a composite take up 650.

The fibrous mat 100 proceeds from the fibrous mat supply 610 to the first film covering forming station 620. At the first film covering forming station 620, the fibrous mat proceeds over a first vacuum screen 621. The first vacuum screen 621 includes a plurality of first vacuum screen apertures 622. A first extruder 623 extrudes a first film material 624 onto the fibrous mat 100 disposed on the first vacuum screen 621. A first vacuum source 625 behind the first vacuum screen 621 draws the first film materials 624 into the fibrous mat 100 forming the first film covering 200 with the first film protuberances 210 and the first film perforations 220 extending into the mat openings/passages 140. In one embodiment, the vacuum source 625 can provide a vacuum of about 20 inches of mercury or less, and preferably between about 10 to about 15 inches of mercury.

The fibrous mat 100 with the first film covering 200 thereon proceeds from the first film covering forming station 220 to the second film covering forming station 630. At the second film covering forming station 630, the fibrous mat 100 and the first film covering 200 are disposed on a second vacuum screen 631 with the first film covering 200 engaging the second vacuum screen 631. The second vacuum screen 631 includes a plurality of second vacuum screen apertures 632, such that at least a portion of the second vacuum screen apertures align with the first film perforations 220 in the first film covering 200. A second extruder 633 extrudes a second film material 634 onto the mat second side 120 of the fibrous mat 100. A second vacuum source 635 behind the second vacuum screen 621 draws the second film material 634 into engagement with the second mat side 120 of the fibrous mat 100 such that the second film material 634 encapsulates fibers 130 on the mat second side 120 of the fibrous mat, and extends into the mat openings/passages 140 on the mat second side 120 to form the second film protuberances 130 and the second film perforations 320 of the second film covering 300. In one embodiment, he vacuum source 635 can provide a vacuum of about 20 inches of mercury or less, and preferably between about 10 to about 15 inches of mercury.

Although FIG. 5 is illustrated as a continuous single process, the present invention can be practice performing the application of the first film covering in a first process, and performing remaining steps in a second separate process. After the second film covering is formed on the fibrous mat 100, the composite structure 10 progresses to a corona treatment station 640, if corona treatment is desired on the final product. After final processing, the composite structure 10 is collected on the composite take up 650.

In addition to the previously mentioned criteria for selecting material of the fibrous mat 100, is the ability of the material of the fibrous mat 100 to be used in the forming process 600 of the composite structure 10. The fibrous mat 100 must be flexible enough to pass over the first and second vacuum screens 621 and 631, as well as the other equipment in the forming process 600. Also, the open area of the fibrous mat 100 the viscosity of the first and second film materials 624 and 634 must be sufficient that the first and second film materials 624 and 634 pull into the material of the fibrous mat 100 for aperturing. In one preferred embodiment, the first and second film materials 624 and 634 have a melt index of from about 10 to about 20, preferably about 18.

The open area of the first vacuum screen 621 is selected to provide the highest probability of the first vacuum screen aperture 622 aligning with mat openings/passages 140 in the fibrous material 100, to facilitate the securing of the first film covering 200 on the fibrous mat 100. In one embodiment, the fibrous mat 100 had an open area of approximately 50%, the open area of the first vacuum screen 621 was from about 60% to about 70%, resulting in an open area of the combination of the fibrous mat 100 with the first film covering 200 of about 15%.

The open area of the second vacuum screen 631 is selected to provide the highest probability of the second vacuum screen aperture 632 aligning with the first film perforations 222 in the first film covering. In one embodiment, the second vacuum screen 631 has an open area of from about 60% to about 70%, and was used on the combination of a fibrous mat 100 with a first film covering 200 having an open area of about 15%, which resulted in the combination of the fibrous mat 100 with the first film covering 200 and the second film covering 300 having an open area from about 1% to about 10%.

The above method was used to produce the following examples of the present invention:

EXAMPLE 1

A JOHNS MANVILLE 8440 fiberglass mat is coated on each side with a high density polyethylene (HDPE) blend film having a weight per area of forty (40) grams per square meter. The HDPE blend includes seventy percent (70%), by weight, of EQUISTOR H6018 (HDPE) and thirty percent (30%), by weight, of DOW 2517 (LDPE) and is about 1.5 mils. thick.

EXAMPLE 2

A JOHNS MANVILLE 8450 fiberglass mat is coated on both sides by a laminate film. The laminate film has a first layer of HDPE blend disposed adjacent to the fiberglass mat, and a second layer of adhesive blend disposed on the side of the laminate opposite to the fiberglass mat. The first layer is a 0.25 mil. layer of an HDPE blend of seventy percent (70%), by weight, of EQUISTOR H6018 and thirty percent (30%), by weight, of DOW 2517. The second layer is a 1.25 mil. layer of an adhesive blend of seventy-five percent (75%), by weight, of DUPONT BYNEL 2022 (EMA copolymer) and twenty-five percent (25%), by weight, of DUPONT SURLYN 1855 (zinc ionomer).

EXAMPLE 3

A JOHNS MANVILLE 8440 fiberglass mat is coated on a first side with a HDPE blend film, and on a second side with a adhesive blend film. The HDPE blend film is a 2.5 mil. film of a blend of seventy percent (70%), by weight, of EQUISTOR H6018 and thirty percent (30%), by weight, of DOW 2517. The adhesive blend film is a 1.0 mil. film of a blend of fifty-two and one-half percent (52.5%), by weight, of DUPONT 2022, seventeen and one-half percent (17.5%), by weight, of DUPONT 1855, and thirty percent (30%), by weight, of DOW 2517.

EXAMPLE 4

A JOHNS MANVILLE 8440 fiberglass mat is coated on both sides with a 1.5 mil. polypropolyene blend film. In this embodiment, the polypropolyene blend is a blend of seventy percent (70%), by weight, of FINA 6573 (PP), twenty-two and one-half percent (22.5%), by weight, of DUPONT 2022, and seven and one-half percent (7.5%) of DUPONT 1855.

Figure 8:
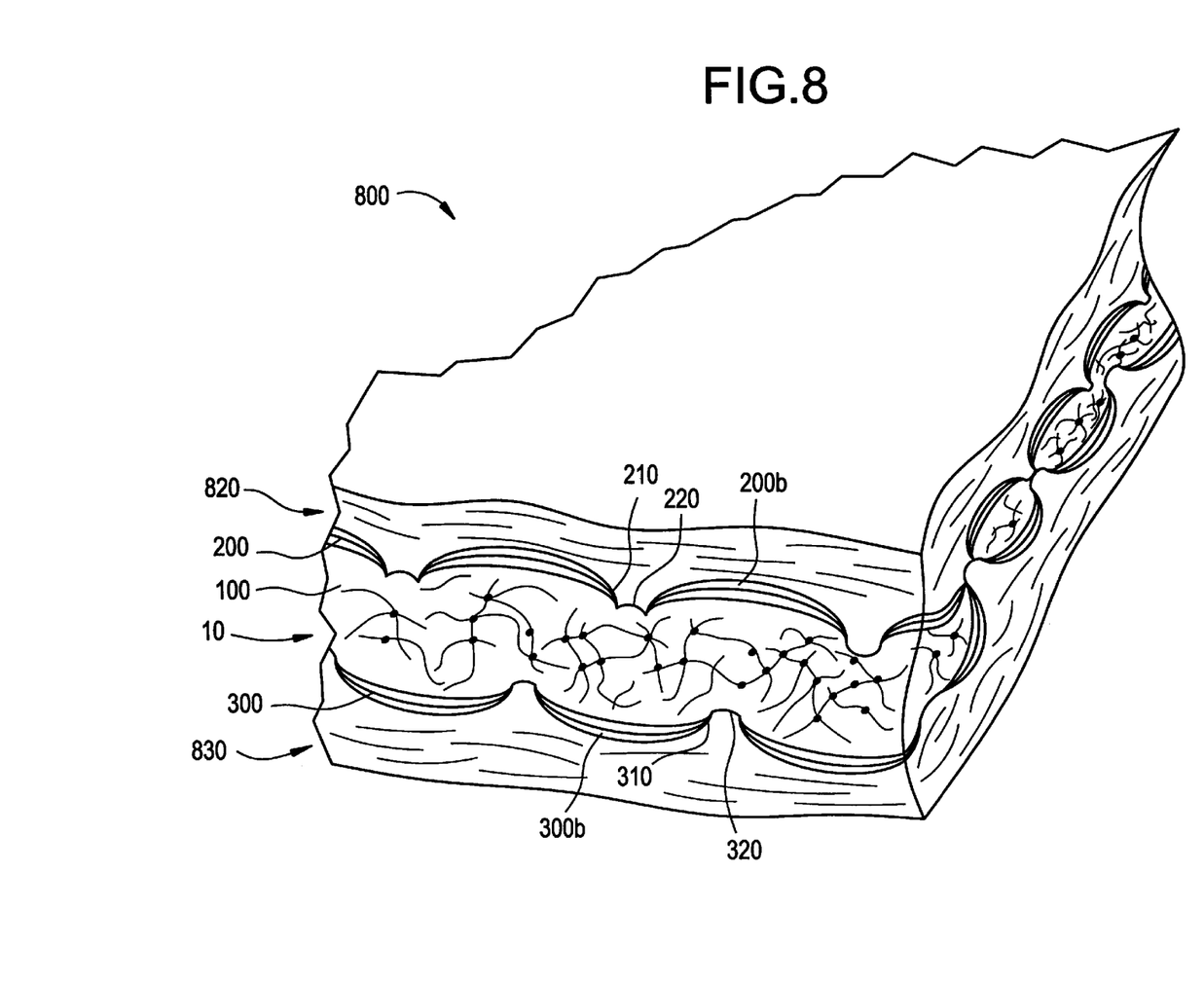

Referring now to FIG. 8, there is shown an embodiment of an invention utilizing the composite material in FIGS. 1–4, illustrated as the component structure 800. The component part 800 generally includes the composite structure 10, a structural foam 820, and a soft foam 830. The composite structure 10 is of the type having an adhesive layer 200*b* and 300*b* disposed outwardly from the fibrous mat 100, as shown in FIG. 4.

The component part 800 is formed by thermally activating the adhesive layers 200*b* and 300*b* on the composite structure 10, and affixing the structural foam 820 and the soft foam 830 to opposite sides of the composite structure 10. The component part 800 can be molded into a shape to accommodate the application of the component part 800 such as for a head liner in an automobile.

Use of the fibrous mat 10 with adhesive layers 200b and 300b, eliminates the need for an adhesive sheet between the fibrous mat and the structural foam 820 or the soft foam 830. Additionally, a part of the present invention is the discovery that the use of the composite structure 10 with the protuberances 210 and 310 and the perforations 220 and 320, provide unexpected additional acoustic attenuation properties the component part 800.

What is claimed is:

1. A composite structure comprising:
    a fibrous mat having a mat first side and a mat second side, said fibrous mat being formed from a plurality of fibers such that a plurality of passages are formed therein;
    a first film covering disposed on the mat first side of said fibrous mat, said first film covering including a plurality of first film protrusions with first film apertures, the plurality of first film protrusions extending into the plurality of passages in said fibrous mat; and
    a second film covering disposed on the mat second side of said fibrous mat, said second film covering including a plurality of second film protrusions with second film apertures, the plurality of second film protrusions extending into the plurality of passages in said fibrous mat.

2. The composite structure according to claim 1, wherein said first film covering is a first adhesive film.

3. The composite structure according to claim 2, wherein said first adhesive film is corona treated.

4. The composite structure according to claim 2, wherein said second film covering is a second adhesive film.

5. The composite structure according to claim 4, wherein said second adhesive film is corona treated.

6. The composite structure according to claim 2, wherein said second film covering is a multi layer film.

7. The composite structure according to claim 6, wherein said multi layer film has an external adhesive layer.

8. The composite structure according to claim 7, wherein said external adhesive layer is corona treated.

9. The composite structure according to claim 1, wherein said first film covering is a first multi layer film.

10. The composite structure according to claim 9, wherein said first multi layer film has an first film external adhesive layer.

11. The composite structure according to claim 10, wherein said first film external adhesive layer is corona treated.

12. The composite structure according to claim 11, wherein said second film covering is a second multi layer film.

13. The composite structure according to claim 12, wherein said second multiple layer film has an second film external adhesive layer.

14. The composite structure according to claim 13, wherein said second film external adhesive layer is corona treated.

15. A composite structure comprising:
    a fibrous mat having a mat first side and a mat second side, said fibrous mat being formed from a plurality of fibers such that a plurality of passages are formed therein; and
    an adhesive film covering disposed on the mat first side of said fibrous mat, said adhesive film covering including a plurality of adhesive film protrusions with adhesive film apertures, the plurality of adhesive film protrusions extending into the plurality of passages in said fibrous mat.

16. The composite structure according to claim 15, wherein said adhesive film covering is corona treated.

17. A composite structure comprising:
    a fibrous mat having a mat first side and a mat second side, said fibrous mat being formed from a plurality of fibers such that a plurality of passages are formed therein; and
    an multi layer film covering disposed on the mat first side of said fibrous mat, said multi layer film covering including a plurality of multi layer film protrusions with multi layer film apertures, the plurality of multi layer film protrusions extending into the plurality of passages in said fibrous mat.

18. The composite structure according to claim 17, wherein said multi layer film covering has an external adhesive layer.

19. The composite structure according to claim 18, wherein said external adhesive layer of said multi layer film covering is corona treated.

20. A process for forming a composite material, comprising the steps of:
    providing a fibrous mat having a mat first side and a mat second side;
    placing the mat second side of the fibrous mat on a first perforated screen;
    disposing a first film covering material on the first side of the fibrous mat disposed on the first perforated screen;
    applying a vacuum to the back side of the first perforated screen with the fibrous mat and first film covering material disposed thereon to form a first film covering on the first side of the fibrous mat;
    placing the fibrous mat onto a second perforated screen with the first film covering adjacent to the second perforated screen;
    disposing a second film covering material onto the second side of the fibrous mat disposed on the second perforated screen;
    applying a vacuum to the back side of the second perforated screen with the first film covering, the fibrous mat, and the second film covering material disposed thereon to form a second film covering on the second side of the fibrous mat.

21. The process according to claim 20, further including the step of corona treating the first film covering on the first side of the fibrous mat.

22. The process according to claim 21, further including the step of corona treating the second film covering on the second side of the fibrous mat.

23. The process according to claim 20, wherein said step of disposing a first film covering material onto the first side of said fibrous mat includes the step of coextruding a multiple layer first film covering material onto the first side of said fibrous mat.

24. The process according to claim 23, further including the step of corona treating the first film covering on the first side of the fibrous mat.

25. The process according to claim 23, wherein said step of disposing a second film covering material onto the second side of said fibrous mat includes the step of coextruding a multiple layer second film covering material onto the second side of said fibrous mat.

26. The process according to claim 25, further including the step of corona treating the second film covering on the second side of the fibrous mat.

27. A process for forming a composite material, comprising the steps of:
    providing a fibrous mat having a mat first side and a mat second side;

placing the mat second side of the fibrous mat on a first perforated screen;

coextruding a multiple layer first film covering material on the first side of the fibrous mat disposed on the first perforated screen; and applying a vacuum to the back side of the first perforated screen with the fibrous mat and first film covering material disposed thereon to form a first film multiple layer covering on the first side of the fibrous mat.

28. The process according to claim 27, further including the step of corona treating the first film multi layer covering on the first side of the fibrous mat.

* * * * *